Figure 1:
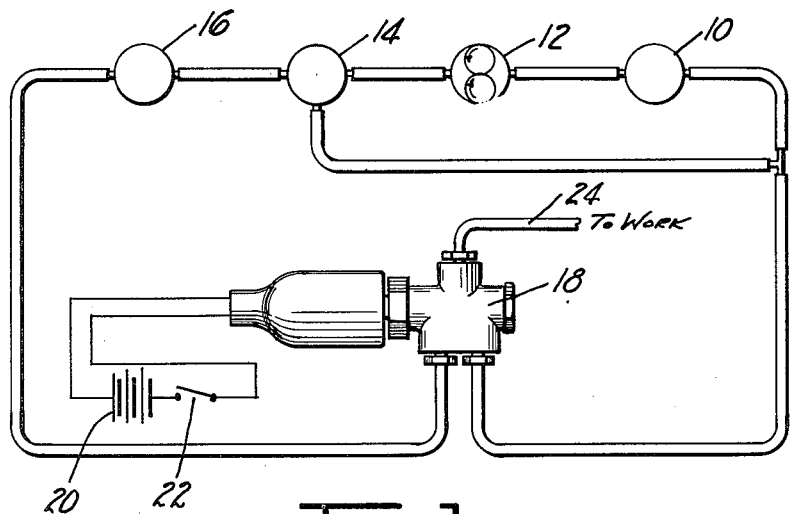

June 26, 1945.    G. W. PONTIUS, 3D., ET AL    2,379,181
SOLENOID OPERATED VALVE
Filed Nov. 5, 1942

INVENTOR
GEORGE W. PONTIUS III
ARTHUR P. WILSON
BY
*[signature]*

Patented June 26, 1945

2,379,181

UNITED STATES PATENT OFFICE 2,379,181

SOLENOID OPERATED VALVE

George W. Pontius, III, and Arthur P. Wilson, South Bend, Ind., assignors to Bendix Aviation Corporation, South Bend, Ind., a corporation of Delaware Application November 5, 1942, Serial No. 464,610

16 Claims. (Cl. 137—139)

This invention relates to improvements in valves, particularly to the type which may be actuated by an electromagnetic force.

In aircraft, where a number of fluid operated devices may be located remotely from a pilot or gunner, it is sometimes expedient to have a control valve adjacent each of said devices, the valve being controlled by means located remotely from the devices, as for example from a cockpit of a plane. It is particularly expedient to employ a valve for such a fluid operated device which can be actuated by the closing of an electrical circuit, whereby a motor can actuate a pilot or controlling element to cause the valve to complete its operating cycle by the pressure maintained in a fluid pressure system. It is an important consideration that such a valve be held to the smallest weight consistent with dependable operation, and to require smallest possible current consumption for operation.

With foregoing and other problems in mind, it is an object of this invention to provide an electromagnetically operated valve wherein a pilot valve is used to control the movement of a larger valve element.

A further object is to provide an electrically operated valve wherein the current demand is held to a very low value.

A still further object is to provide a valve of the type wherein a poppet is used to seal off high pressures and wherein a sliding or piston valve is used to seal off low pressures.

Yet another object comprehends the provision of a valve wherein a hammer or the like moves in response to an electromagnetic force to effect the positive and rapid opening of a pilot valve with a minimum of current consumption.

Yet another object is to provide a valve operable under extremely high pressures, such as are employed in aircraft, which will be extremely light in weight and small in bulk, two important considerations in connection with aircraft use.

Other objects of the invention will be apparent from a study of the following description, which shows a preferred embodiment, but it is not intended that the scope of this invention be limited by the embodiments shown, the scope of the invention being determined by the claims which will be found at the end of this description.

This application is a continuation-in-part of our copending application Serial No. 371,742, filed December 26, 1940.

Figure 2:
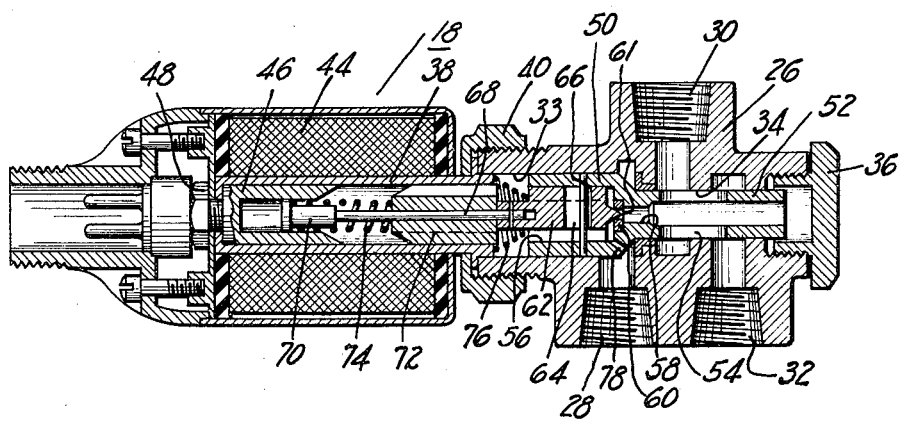

In the drawing which shows a preferred embodiment of the invention,

Figure 1 is a diagrammatic view of the valve incorporated in a fluid pressure system of the type which is commonly employed in aircraft; and Figure 2 is a longitudinal vertical section of the valve shown in Figure 1.

Referring now to Figure 1, there is shown a reservoir 10 which maintains a supply of fluid which is placed under pressure by a pump 12. The pumped fluid passes through a regulating valve 14 of the type which is disclosed in Schultz application, Serial No. 445,629, filed June 3, 1942, and MacDuff application, Serial No. 451,593, filed July 20, 1942. The function of valve 14 which is described in detail in the two applications referred to passes the pumped fluid when in excess of a predetermined pressure back to the reservoir 10. An accumulator 16 maintains the fluid between an upper predetermined limit of pressure and a lower predetermined limit of pressure, and supplies pressure to the valve 18, which is operable to pass fluid through a conduit 24 to work, upon the closing of a circuit containing a source of power, as for example the battery 20, and a switch 22.

Referring now to Figure 2, the valve 18 comprises a body 26 having an inlet port 28, a work port 30 and an exhaust port 32 to atmosphere. The housing 26 has within it a passage of larger diameter 33 which is coaxial with a passage of smaller diameter 34. The smaller diameter passage 34 is closed at its right end by a nut 36 threaded into the right end of the housing 26. A closed cylindrical extension 38 is coaxial with the larger diameter passage 33 and has a flange thereon which is held to the housing 26 by means of an annular nut 40. A solenoid unit 44 surrounds the other cylindrical extension 38 and is secured thereto by means of a hollow threaded element 46 which is engaged by a nut 48.

A main valve member 50 includes a piston portion 52 having a slotted portion as at 54. The main valve member 50 is seated at the juncture of the larger diameter passage with the smaller diameter passage in the manner shown, when the inlet port 28 is sealed from the working port 30. The main valve member 50 is hollow and has a bore 56 therein which is coaxial with a second bore 58 in the valve member 50, which bore 58 is in communication with the slotted portion 54. A seat 60 having a restricted opening 61 is maintained in the bore 58, and is positioned at the juncture of the bore 56 with the bore 58.

A pilot valve 62 has a fluted shape as shown and is adapted to be positioned on the seat 60, and is arranged for limited movement with respect to the main valve member 50 by means of a slot 64 therein and a pin 66 secured to the main valve member 50. Secured to the pilot valve 62 is an extensible shank 68 which terminates in a head 70 as shown. Mounted on the stem 68 is a fluted hammer 72 which is normally biased to the right by the weak spring 74. A conical spring 76 is held between the pilot valve 62 and the right end of the cylindrical extension 38.

A restricted passage 78 communicates the inlet port 28 with the interior of the valve member 50, and is of an effective diameter less than the opening 61 in the seat 60.

The operation of the valve just described is as follows:

The position of the parts as shown in Figure 2 is that when the valve is in closed position, preventing communication of the pressure to the inlet port 28 with the working port 30. As shown, the working port 30 is in direct communication with the exhaust port 32. The pilot valve 62 is held against the seat 60 by means of the conical spring 76, thus preventing leakage into the bore 58.

When the solenoid 44 is energized, as by closing the switch 22 of Figure 1, it attracts the fluted hammer 72 to the left, which compresses the weak spring 74, and thus strikes the head 70 of the shank 68. This operation unseats the pilot valve 62, allowing the pressure behind the valve member 50 to be dissipated through the bore 58. Since the opening 61 in seat 60 is larger than the orifice 78, the pressure within the valve member 50 will become greatly less than the pressure at the inlet port 28, thus allowing the inlet pressure to act against its seat, thereby moving it to the left, allowing the slot 54 in the piston member 52 to communicate the pressure in the inlet port 28 with the working port 30. At such time port 32 will be lapped by the leftwise movement of the piston member 52.

When it is desired to close the valve, the solenoid 44 is deenergized, and the fluted hammer 72 is no longer attracted toward the left, and is urged to the right by the spring 74. Conical spring 76 then seats the pilot valve 62, which allows pressure to be built up behind it through the orifice 78. The fluid under pressure behind the main valve member 50 then forces the member 50 to the right thereby seating it at the juncture of the enlarged passage 33 and the smaller passage 34. The same movement of the main valve member 50 causes the slotted portion to maintain communication between the working port 30 and the exhaust port 32, as shown in Figure 2.

Thus has been described a novel and distinct improvement in magnetically operated valves of the type which are particularly adaptable to use in aircraft, since the consumption of current is very small and since the valve is very light in weight and occupies very little bulk. While the invention has been described with reference to a preferred embodiment, it is intended not to be limited by the embodiment shown nor otherwise than by the claims hereto appended.

We claim:

1. A valve of the class described comprising a housing having a passage therein and an inlet, exhaust and working ports, a valve member having an interior cavity portion in said passage for normally closing the inlet port and maintaining communication between the working and exhaust ports and movable to connect the inlet port with the working port and to close the exhaust port, said valve member being constituted to establish communication between said exhaust port and working port at all times when closed to said inlet, an orifice in said valve member connecting said interior cavity portion of the valve member with the inlet port, a bore within said valve member open to exhaust, a passage connecting the interior cavity portion of said valve member with said bore, a pilot valve normally closing the said bore and having an extended shank, a hammer supported on said shank and adapted to move in response to an electromagnetic force to open the pilot valve whereby a differential pressure is created across the valve member to move said valve member to a position to connect the inlet port with the working port.

2. A valve of the class described comprising a housing having a passage therein and an inlet, exhaust and working ports, a valve member having an interior cavity portion in said passage for normally closing the inlet port and maintaining communication between the working and exhaust ports and movable to connect the inlet port with the working port and to close the exhaust port, said valve member being constituted to establish communication between said exhaust port and working port at all times when closed to said inlet, an orifice in said valve member connecting said interior cavity portion of the valve member with the inlet port, a bore within said valve member open to exhaust, a passage connecting the interior cavity portion of said valve member with said bore, a pilot valve normally closing said bore and having an extended shank terminating in a head portion, a hammer supported on said shank and adapted to move in response to an electromagnetic force to exert a blow on said head to open the pilot valve whereby a differential pressure is created across the valve member to move said valve member to a position to connect the inlet port with the working port.

3. A valve of the class described comprising a housing having a passage therein and an inlet, exhaust and working ports, a valve member having an interior cavity portion in said passage for normally closing the inlet port and maintaining communication between the working and exhaust ports and movable to connect the inlet port with the working port and to close the exhaust port, said valve member being constituted to establish communication between said exhaust port and working port at all times when closed to said inlet, an orifice in said valve member connecting said interior cavity portion of the valve member with the inlet port, a bore within said valve member open to exhaust, a passage connecting the interior cavity portion of said valve member with said bore, a pilot valve normally closing said bore and having an extended shank terminating in a head portion, a hammer supported on said shank and spring-biased toward said pilot valve and adapted to move in response to an electromagnetic force to exert a blow on said head to open the pilot valve whereby a differential pressure is created across the valve member to move said valve member to a position to connect the inlet port with the working port.

4. A valve of the class described comprising a housing having a passage of enlarged diameter through one part and of a smaller diameter through another part, an inlet port to the passage of enlarged diameter, working and exhaust ports to the passage of smaller diameter, a hollow valve member having a bore therein at times communicating the interior of the hollow valve member with the exhaust port, said hollow valve member being movable in said passage selectively to communicate the working port with the inlet port or the exhaust port and normally seated at the juncture of the two diameters, an orifice in the hollow valve member so disposed to furnish fluid under pressure at the inlet port to the interior of the hollow valve member, a pilot valve adapted to close the bore and having an extended shank, a hammer supported on said shank and adapted to move in response to an electromagnetic force to unseat the pilot valve to dissipate the pressure within the hollow valve member to create a pressure differential across the hollow valve member to move the hollow valve member to a position whereby the inlet port is in communication with the working port.

5. A valve of the class described comprising a housing having a passage of enlarged diameter through one part and of a smaller diameter through another part, an inlet port to the passage of enlarged diameter, working and exhaust ports to the passage of smaller diameter, a hollow valve member having a bore therein at times communicating the interior of the hollow valve member with the exhaust port, said hollow valve member being movable in said passage selectively to communicate the working port with the inlet port or the exhaust port and normally seated at the juncture of the two diameters, an orifice in the valve so disposed to furnish fluid under pressure at the inlet port to the interior of the hollow valve member, a pilot valve adapted to close the bore and having an extended shank, said pilot valve being arranged for only limited movement with respect to the hollow valve member by a pin engaging said hollow valve member and passing through a slot in said pilot valve, a hammer supported on said shank and adapted to move in response to an electromagnetic force to unseat the pilot valve to dissipate the pressure within the hollow valve member to create a pressure differential across the hollow valve member to move the hollow valve member to a position whereby the inlet port is in communication with the working port.

6. The invention according to claim 5, wherein the pilot valve is spring-biased to urge said pilot valve to closed position.

7. A combined piston and poppet valve comprising a housing having coaxial passages therein of enlarged diameter in one part and of smaller diameter in another part, an inlet port connected to the passage of enlarged diameter, and working and exhaust ports to the passage of smaller diameter, a valve member movable in said passages and forming a poppet at the juncture of said passages and forming a piston in the smaller diameter passage, a bore through said valve member, a passage between the bore and the working port, an orifice in the valve member connecting the bore with the inlet port, a pilot valve having an extended shank thereon, said pilot valve being constructed and arranged to normally close the flow from the orifice through the bore, a hammer supported by said shank and adapted to move in response to an electromagnetic force to open the pilot valve, whereby a differential pressure is created across the valve member to move said valve member to a position to connect the inlet port with the working port.

8. The invention as defined in claim 7 wherein the piston portion of said valve member has a slotted aperture therein to pass fluid from the working port to the exhaust port when the poppet is in closed position.

9. A combined piston and poppet valve comprising a housing having coaxial passages therein of enlarged diameter in one part and of smaller diameter in another part, an inlet port connected to the passage of enlarged diameter, and working and exhaust ports to the passage of smaller diameter, a valve member movable in said passages and forming a poppet at the juncture of said passages and forming a piston in the smaller diameter passage, a bore through said valve member, a passage between the bore and the working port, an orifice in the valve member connecting the bore with the inlet port, a pilot valve having an extended shank portion thereon, said pilot valve being constructed and arranged to normally close the flow from the orifice through the bore, a lost motion connection between the valve member and the pilot valve to limit the movement of the latter with respect to the former, a hammer supported by said shank and adapted to move in response to an electromagnetic force to open the pilot valve, whereby a differential pressure is created across the valve member to move said valve member to a position to connect the inlet port with the working port.

10. The invention according to claim 9 wherein the pilot valve is spring-biased to urge same to closed position.

11. A combined piston and poppet valve comprising a housing having coaxial passages therein of enlarged diameter in one part and of smaller diameter in another part, an inlet port connected to the passage of enlarged diameter, and working and exhaust ports to the passage of smaller diameter, a valve member movable in said passages and forming a poppet at the juncture of said passages and forming a piston in the smaller diameter passage, a bore through said valve member, a passage connecting the bore with the working port, an orifice in the valve member connecting the bore with the inlet port, a pilot valve having an extended shank terminating in a head portion, said pilot valve being constructed and arranged to normally close the flow from the orifice through the bore, a hammer supported by said shank and adapted to move in response to an electromagnetic force to exert a blow on said head to open the pilot valve, whereby a differential pressure is created across the valve member to move said valve member to a position to connect the inlet port with the working port.

12. A combined piston and poppet valve comprising a housing having coaxial passages therein of enlarged diameter in one part and of smaller diameter in another part, an inlet port connected to the passage of enlarged diameter, and working and exhaust ports to the passage of smaller diameter, a valve member movable in said passages and forming a poppet at the juncture of said passages and forming a piston in the smaller diameter passage, a bore through said valve member, a passage connecting the bore with the working port, an orifice in the valve member connecting the bore with the inlet port, a pilot valve having an extended shank terminating in a head portion, said pilot valve being constructed and arranged to normally close the flow from the orifice through the bore, a hammer supported by said shank and spring-biased toward said pilot valve and adapted to move in response to an electromagnetic force to exert a blow on said head to open the pilot valve, whereby a differential pressure is created across the valve member to move said valve member to a position to connect the inlet port with the working port.

13. In a valve of the class described comprising a housing having a passage and an inlet, exhaust and working ports communicating with said passage, a valve member slidable in said passage and adapted to seat therein to cut off communication between the inlet and working port, said valve member having internal communication with said working port and inlet, and a spring biased pilot valve adapted to close said internal communication.

14. In a valve of the class described comprising a housing having a passage and an inlet, exhaust and working ports communicating with said passage, a valve member in said passage having an internal valve seat with an opening therein adapted to provide communication between the inlet and working port, and a pilot valve spring biased to cooperate with said internal valve seat.

15. In a valve of the class described comprising a housing having a passage and an inlet, exhaust and working ports communicating with said passage, a valve member in said passage having an internal valve seat with an opening therein communicating with the working port and a second opening communicating with the inlet, a pilot valve, spring biased to cooperate with said first named opening, and electro-magnetic means for actuating said pilot valve.

16. In a valve of the class described comprising a housing having a passage and an inlet, exhaust and working ports communicating with said passage, a valve member in said passage having an internal valve seat with an opening therein communicating with the working port and a second opening communicating with the inlet port, said second opening having an effective diameter less than the diameter of said first named opening, a pilot valve limited in movement and slidable within said valve member and spring biased to cooperate with said first named opening.

GEORGE W. PONTIUS, III.
ARTHUR P. WILSON.